Nov. 25, 1952     R. L. CAMILLY ET AL     2,618,874
VEHICLE AXLE CLEARING PLOW
Original Filed June 12, 1947     3 Sheets-Sheet 1
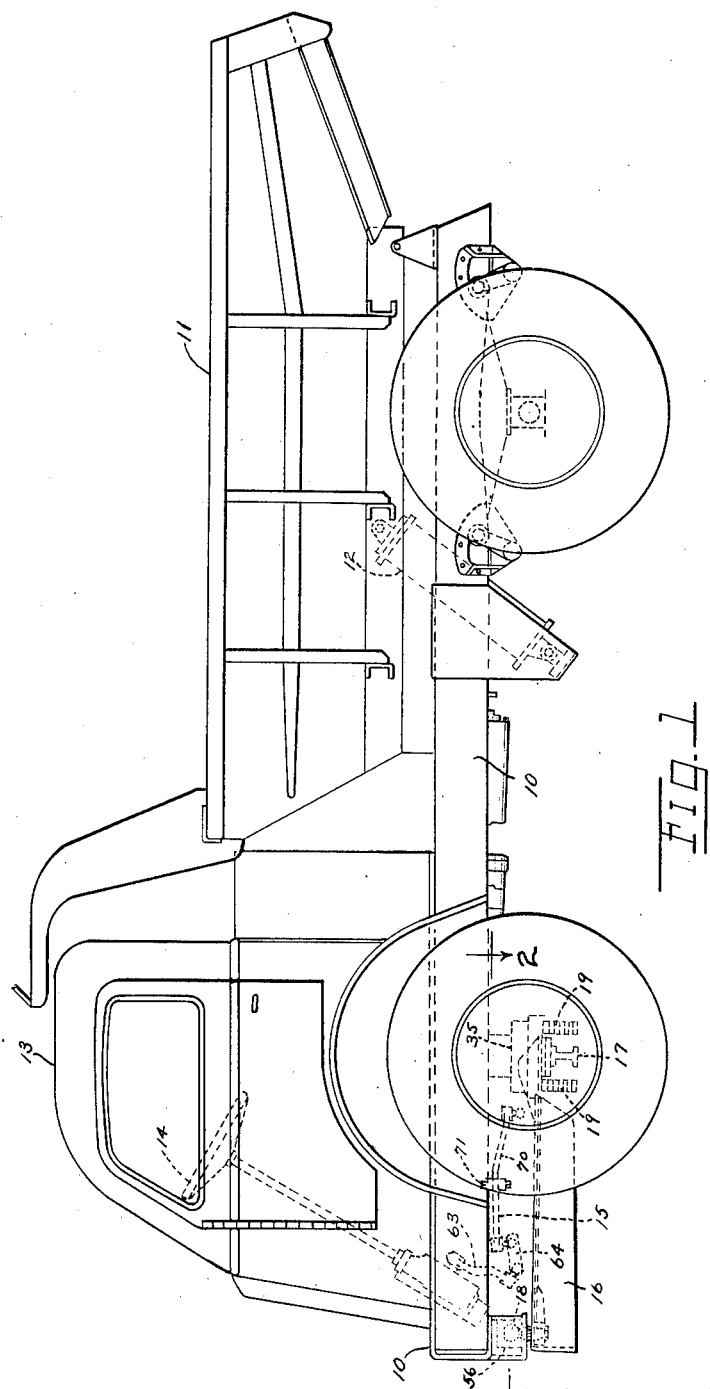
INVENTORS
ROGER L. CAMILLY
ORPHEUS F. QUARTULLO
By Hyde, Meyer, Baldwin & Doran
ATTORNEYS

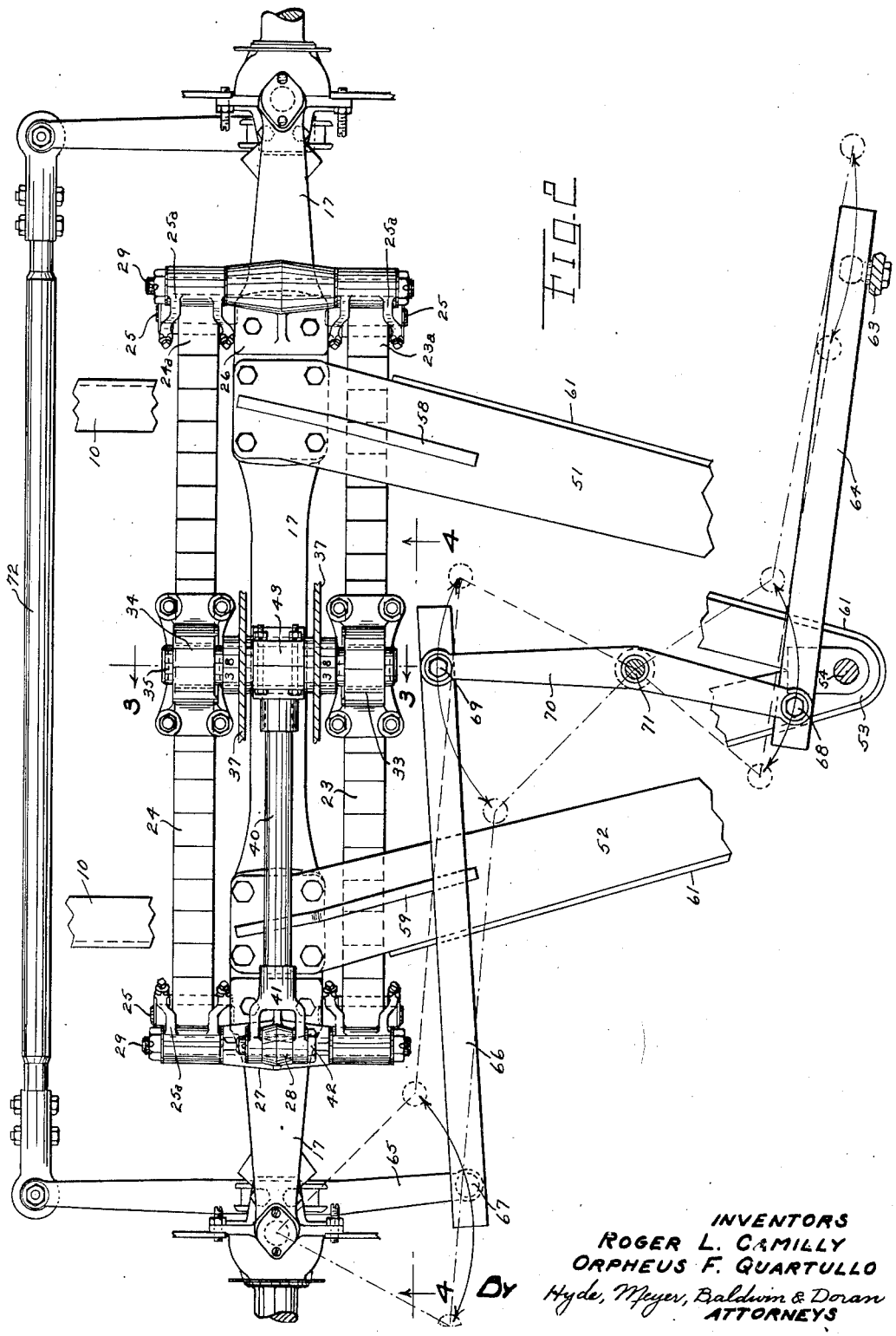

Nov. 25, 1952     R. L. CAMILLY ET AL     2,618,874
VEHICLE AXLE CLEARING PLOW
Original Filed June 12, 1947     3 Sheets-Sheet 3
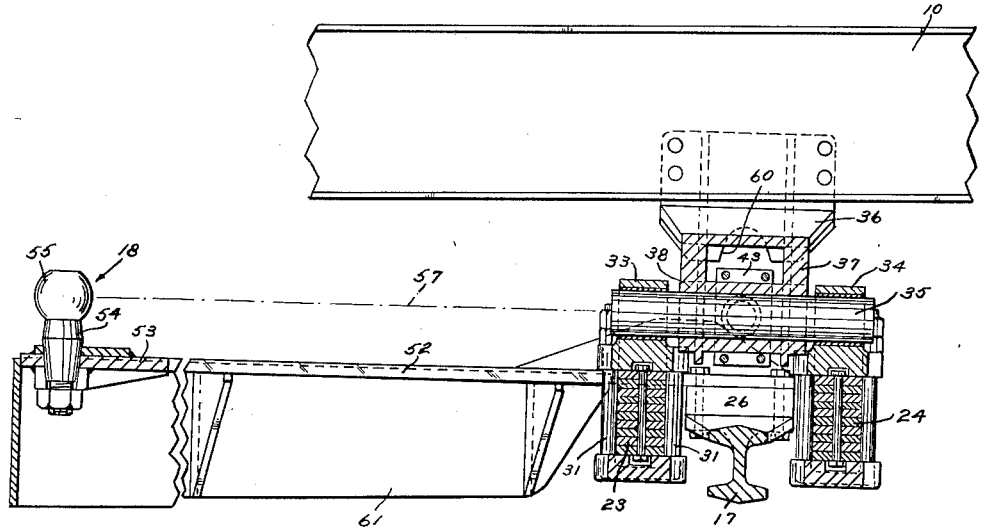
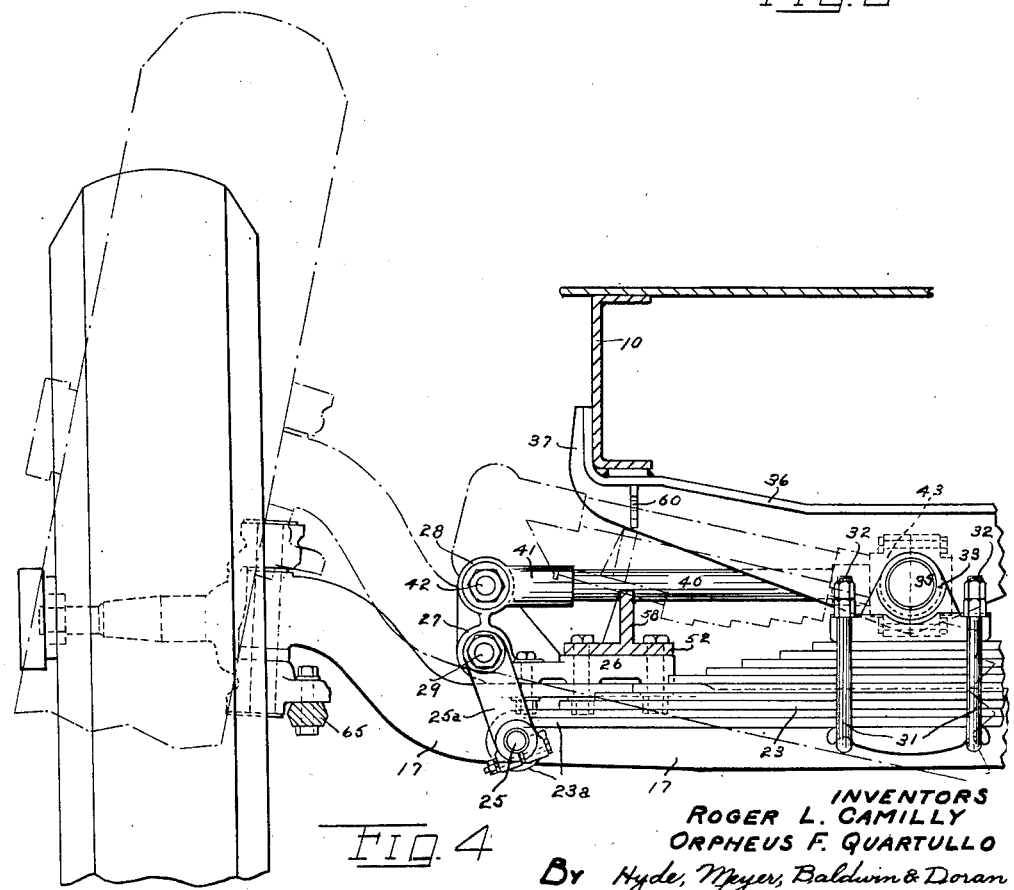
INVENTORS
ROGER L. CAMILLY
ORPHEUS F. QUARTULLO
By Hyde, Meyer, Baldwin & Doran
ATTORNEYS Patented Nov. 25, 1952

2,618,874

UNITED STATES PATENT OFFICE 2,618,874

VEHICLE AXLE CLEARING PLOW

Roger L. Camilly, Cleveland, and Orpheus F. Quartullo, South Euclid, Ohio, assignors to The Euclid Road Machinery Co., Euclid, Ohio, a corporation of Ohio Original application June 12, 1947, Serial No. 754,142. Divided and this application July 10, 1948, Serial No. 38,036

2 Claims. (Cl. 37—172)

This invention relates to improvements in front end construction of a motor driven vehicle and more particularly to a plow carried at the front end of the vehicle in a novel manner.

One of the objects of the present invention is to provide, in combination with a motor driven chassis, a frame forming part of the chassis and extending forwardly of the front axle, a V-shape wishbone having its apex secured to said frame and having its legs rigidly connected to the front axle at spaced points, and a plow or scraper mounted on the wishbone.

Another object of the invention is the provision, in the combination of the preceding paragraph, of a pivotal connection between the apex of the wishbone and the frame so that the wishbone and plow move up and down with the front axle so that the axle is always protected by the scraper or plow in front of it.

A further object of the invention is to provide a scraper or plow in front of a motor driven vehicle so as to spread loose dirt in front of the vehicle and to throw some of that dirt under the front wheels of the vehicle so that the dirt is packed down as the vehicle passes over it.

This application is a division of our copending application Serial No. 754,142, filed June 12, 1947, for Front Axle and Steering Assembly, now Patent No. 2,553,746, issued May 22, 1951.

Other objects and advantages including further novel features of the invention will be apparent from the accompanying drawings and specification, and the essential features thereof wall be set forth in the appended claims.

In the drawings,

Fig. 1 is a side elevational view of a heavy duty dump truck equipped with a front end suspension and steering linkage embodying our invention;

Fig. 2 is a detailed sectional view, somewhat enlarged, taken on the line 2—2 of Fig. 1;

Figs. 3 and 4 are sectional views taken on the lines 3—3 and 4—4 of Fig. 2.

It will be apparent, as the description proceeds, that the inventive features illustrated and described herein are especially adapted to solve problems arising in the operation of heavy duty vehicles over rough roads or uneven terrain. Under such conditions the spring suspension and steering mechanism of the vehicle are subjected to severe shocks and strains. In the structure now to be described material improvements have been made in both the spring suspension and steering linkage, whereby severe shocks are absorbed by novel means, the tractive effect is applied to the front axle by novel structure, and operation of the steering wheel is effected without abnormal operating effort. It will be apparent that the features herein disclosed are applicable to various types of land and road vehicles.

The drawings show the general features of a heavy dump truck including a frame 10, a tiltable body 11, power means 12 for dumping, an operator's cab 13, a steering wheel 14, steering linkage 15 (in broken lines), a wishbone connection 16 between the front axle 17 and the frame 10, the wishbone and frame being connected through a ball joint 18, and a dual transfer spring suspension 19 which is best shown in Figs. 2, 3, and 4. The details of the spring suspension, the stabilizing means, the steering linkage, and other general features of the vehicle are fully described in our copending application mentioned above to which reference may be had for further information.

The present invention is related to the novel front end construction. New and improved means is provided for maintaining longitudinal alignment of the axle and frame, and for applying tractive effort to the axle.

This means is shown as a V brace, hereinbefore descriptively termed a "wishbone," and comprises a pair of rigid structural members 51 and 52 fixed at their rear ends to saddle brackets 26 on the front axle 17, and extending forwardly and converging to an apex or union at 53 (Figs. 2 and 3). A universal joint 18 is provided for uniting the wishbone apex and the frame. Extending upwardly from the wishbone apex is a stud 54 having a ball top 55 which is nested in a socket bearing 56 depending from frame 10. To permit free, spring-suspended rock of the frame with respect to the wishbone and axle, the center of rotation of the ball joint is in rectilinear alignment with the axis of the main suspension pin 35, as indicated by the broken line 57 in Fig. 3. Driving tension is thereby applied to the front axle from the front portion of the frame, and the sprung weight of the vehicle may rock or sway without any twisting stresses on the wishbone.

At their rear ends the wishbone members 51 and 52 carry upwardly extending bumper flanges 58 and 59 which, in case of extreme vehicle frame sway, make contact with the under surface of the frame supporting cradle 36. In such case, as indicated by the broken line position in Fig. 4, clearance for the stabilizer bar 49 is provided by an arched recess 60 in the cradle 36, so that the stabilizer bar takes no impact.

If desired, scraper means 61 (Fig. 3) may be suspended from the wishbone members 51 and 52 for dirt clearing, or other purposes, and the scraper protects various underframe elements from injury. This scraper will throw loose dirt on a fill or the like approximately as far laterally as the front wheels, which pack it down.

Referring to Figs. 1 and 3 it will be noted that the front axle 17 may move freely up and down on its suspension springs 19 and the wishbone 51—52 will follow every movement of the front axle as the wishbone pivots about the universal joint 18 at its apex. It results from this construction that the scraper or plow 61 provides protection for the front axle in any vertical position it may assume.

What we claim is:

1. In a land vehicle, a frame, front and rear wheel means for supporting said frame, a front axle connecting said front wheel means and pivotally connected to said frame on a central longitudinal axis, a wishbone extending forwardly from spaced points on said axle, said wishbone having an apex portion pivotally connected with said frame at a point lying in said axis, whereby tractive effort applied to said frame is transmitted to the front axle through the wishbone without interfering with relative oscillating motion between the frame and axle around said axis, and earth scraper means carried by and depending from said wishbone and adapted to spread material in front of said vehicle as the latter moves forwardly.

2. In combination, a land vehicle having a frame supported by front and rear wheel means, a front axle connecting said front wheel means and pivotally connected to said frame on a central longitudinal axis, a V-shaped wishbone opening rearwardly and having its arms rigidly connected at spaced points to said front axle, said wishbone extending forwardly to an apex, a universal joint connection between the apex portion of said wishbone and said frame, the central portion of which lies in said axis, whereby tractive effort applied to said frame is transmitted to the front axle through the wishbone without interfering with relative oscillating motion between the frame and axle around said axis, and a plow consisting of plates extending along the sides of the arms of said wishbone and downwardly therefrom and adapted to spread material in front of said vehicle as the latter moves forwardly.

ROGER L. CAMILLY.
ORPHEUS F. QUARTULLO.

REFERENCES CITED

The following references are of record in the file of this patent:

UNITED STATES PATENTS

| Number | Name | Date |
|---|---|---|
| 1,218,075 | Ganung | Mar. 6, 1917 |
| 1,348,512 | Mills | Aug. 3, 1920 |
| 1,365,153 | Clark | Jan. 11, 1921 |
| 1,506,551 | Anderson | Aug. 26, 1924 |
| 1,798,077 | Garner | Mar. 24, 1931 |
| 1,995,500 | Dillon | Mar. 26, 1935 |
| 2,355,204 | Couse | Aug. 8, 1944 |
| 2,356,600 | Lentz | Aug. 22, 1944 |

FOREIGN PATENTS

| Number | Country | Date |
|---|---|---|
| 65,864 | Sweden | Aug. 28, 1928 |